(No Model.)
R. H. AVERY.
CORN PLANTER.
No. 407,848. Patented July 30, 1889.
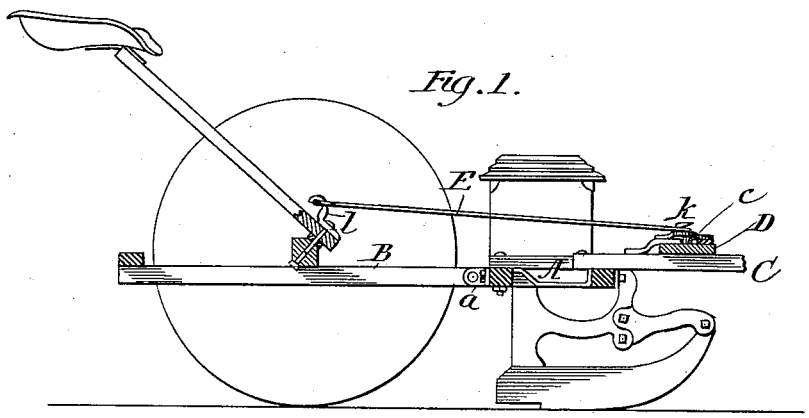
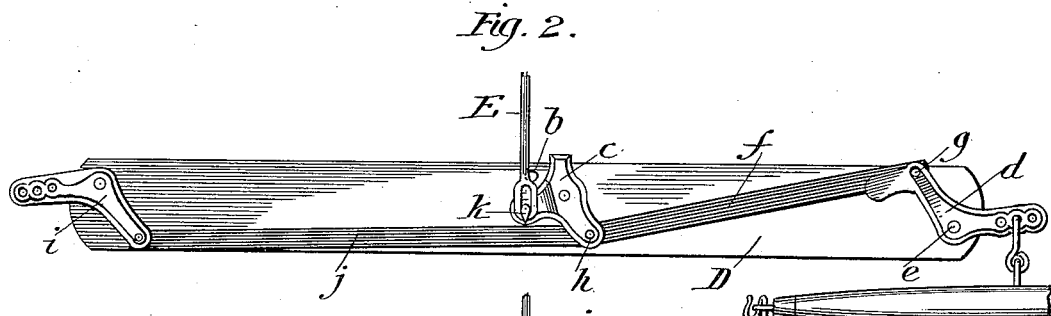
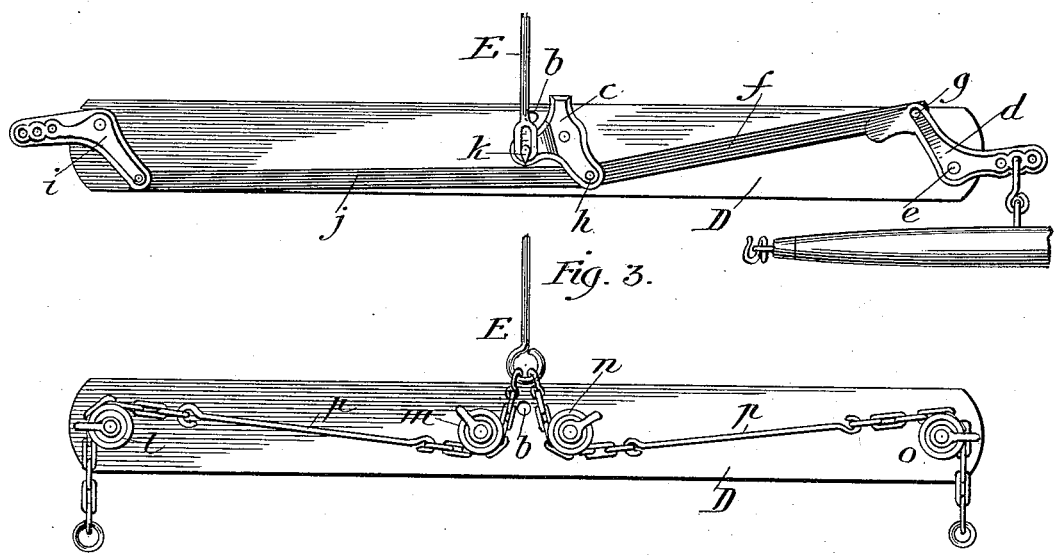
Witnesses:
Albert H. Adams
Harry T. Jones
Inventor:
Robert H. Avery

UNITED STATES PATENT OFFICE.

ROBERT H. AVERY, OF PEORIA, ILLINOIS, ASSIGNOR TO THE AVERY PLANTER COMPANY, OF SAME PLACE.

CORN-PLANTER.

SPECIFICATION forming part of Letters Patent No. 407,848, dated July 30, 1889.

Application filed July 20, 1888. Serial No. 280,517. (No model.)

*To all whom it may concern:*

Be it known that I, ROBERT H. AVERY, residing at Peoria, in the county of Peoria and State of Illinois, and a citizen of the United States, have invented a new and useful Improvement in Corn-Planters, of which the following is a specification, reference being had to the accompanying drawings, in which—

Figure 1 is a vertical and longitudinal section. Fig. 2 is a plan of the evener detached from the planter. Fig. 3 is a modification. Figs. 2 and 3 are enlarged.

My invention relates to that class of planters which have two frames hinged together. The tendency of the draft in such planters, as the power is now applied, is to lift the front end of the planter and runners from the ground.

The leading object of my invention is to overcome this difficulty, which I accomplish as illustrated in the drawings and hereinafter fully described.

That which I claim as new will be pointed out in the claim.

In the drawings, A represents a part of the front frame of a corn-planter, which carries the runners and the seed-boxes.

B is a part of the rear frame, which is hinged to the front frame at $a$ in any known manner.

C is a tongue.

D is an evener-bar.

$b$ indicates the location of the hammer-pin.

$c$ is a lever pivoted upon the evener a little to one side of the hammer-pin, which is at the center longitudinally.

$d$ is a lever pivoted to the evener-bar at $e$.

$f$ is a bar, one end of which is pivoted to the lever $d$ at $g$, and the other end is pivoted to the lever $c$ at $h$. $i$ is another lever pivoted to the evener.

$j$ is a rod or bar pivoted at one end to the lever $i$ and at the other end to the lever $c$ at $h$.

E is a draft-rod, the forward end of which is provided with a loop which engages with a hook $k$ upon the lever $c$, the hook being in line with the hammer-pin and over the center of the evener. The rear end of this draft-rod is connected with a hook $l$, which hook is attached to the rear part of the machine. The outer ends of the levers $d$ and $i$ are provided with a series of holes, and whiffletrees, which are not shown, are to be connected with these levers.

The operation is as follows: When the machine is in motion, the greater portion of the draft will be upon the rear frame, through the rod E, though a small part of the draft may be exerted upon the front frame. When the power is applied to the levers $d$ $i$, the action of these levers, through the bars $f$ $j$, upon the lever $c$ is to shorten the distance between the hook $l$ and the hammer-pin, and this shortening has a tendency to force the planter-runners into the ground. By disconnecting the rod E the evener can be used in the usual way.

I do not limit myself to the exact means shown in Fig. 2 for connecting the rod E with the planter.

I have shown in Fig. 3 a modification. In this Fig. 3 there is a system of pulleys $l$ $m$ $n$ $o$ on the evener-bar, and chains $p$, which run around the pulleys. The connecting-rod E is used substantially as before, but it is connected with the chains $p$, to which the whiffletrees are to be attached at their forward ends. The pulleys take the place of the levers shown in Fig. 2. When the draft is applied to the whiffletrees at the ends of the chains, the tendency and effect is to shorten the distance between the hook $l$ and the hammer-pin, and thus the results will be the same as before described. In both cases the draft of the team will have a tendency to hold the front frame of the planter to the ground. Heretofore in planters of this class the driver by means of levers has held the front frame of the planter to the ground. The pressure upon the runners can be increased or diminished by connecting the whiffletrees with the levers $d$ and $i$ at different holes. The lever $c$ is provided with a stop arranged to engage with the rear edge of the bar $j$, and the lever $d$ is provided with a stop arranged to engage with the front edge of the bar $f$, which stops limit the movement of the levers and prevent the runners from being forced too far into the ground. When the form shown in Fig. 3 is used, the forward end of the rod E will serve the purpose of a stop by coming in contact with the pulleys $m$ $n$.

The rod E can, if desired, be so constructed that its length can be varied.

What I claim as new, and desire to secure by Letters Patent, is as follows:

In a corn-planter having two frames hinged together, a draft-rod E, connected at one end with the rear frame of the planter, in combination with an evener provided with a system of levers or bars or their equivalents, with which the front end of the rod E is connected, substantially as set forth, whereby a part of the power applied to the whiffletrees will be exerted upon the rear frame, substantially as and for the purposes specified.

ROBERT H. AVERY.

Witnesses:
ALBERT H. ADAMS,
HARRY T. JONES.